Jan. 19, 1960
H. G. BOYLE
2,922,041
LINEAR STAIRCASE COUNTER
Filed June 9, 1958
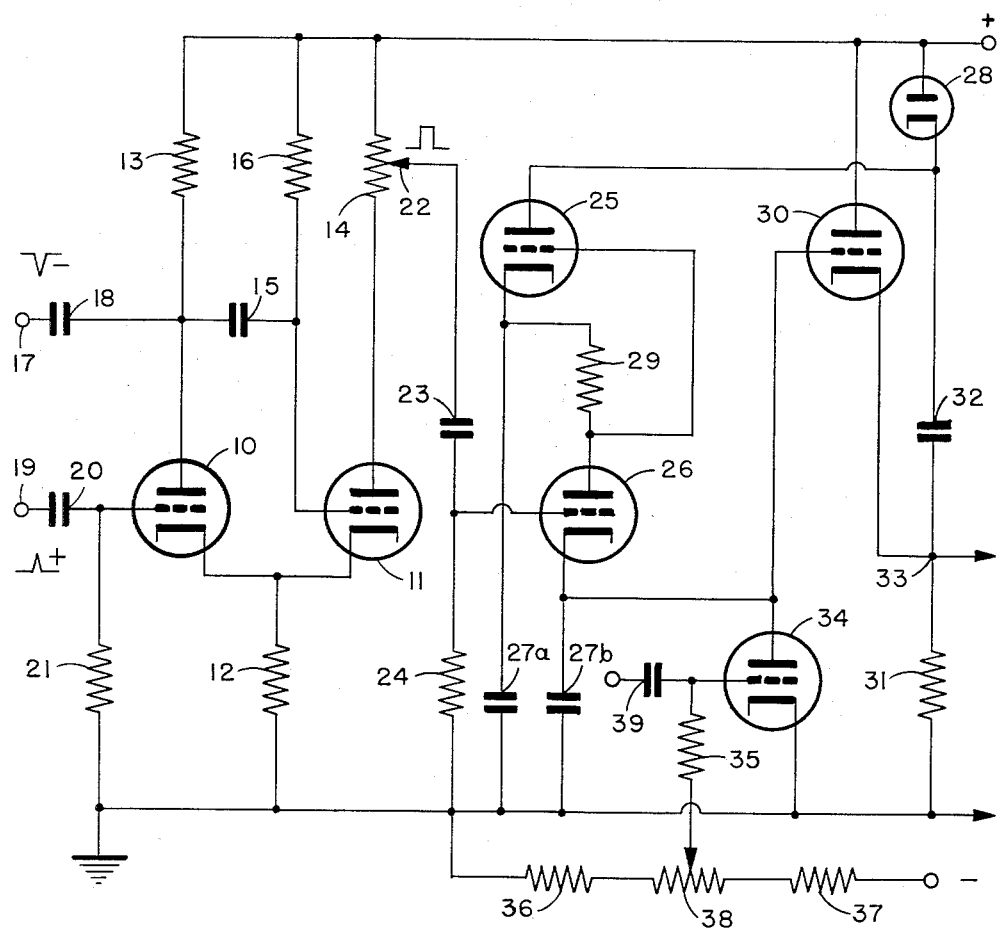
*INVENTOR.*
HOMER G. BOYLE.
BY *Alden D. Redfield*
*Irwin P. Garfinkle*
ATTORNEYS.

United States Patent Office 2,922,041
Patented Jan. 19, 1960

2,922,041
LINEAR STAIRCASE COUNTER

Homer G. Boyle, Dayton, Ohio, assignor to Avco Manufacturing Corporation, Cincinnati, Ohio, a corporation of Delaware Application June 9, 1958, Serial No. 740,634

5 Claims. (Cl. 250—27)

This invention relates to an electronic counter circuit for counting pulses of electrical energy and, more particularly, to a staircase counter which will produce a voltage output which is linear in accordance with the number of pulses supplied to it.

The use of staircase counters in the prior are is well known and has found application in telemetering, in command control systems, in computing systems and in many other areas where it is desired to produce a linear voltage function which is directly proportional to the number of pulses generated by a source. In the usual staircase counters, the output of a condenser charged with pulses from a charging circuit is coupled to the grid of a cathode follower, and the resulting output voltage from the cathode follower is a function of the number of pulses of energy supplied to the condenser. As is well known, a condenser is charged at an exponential rate determined by the time constants in the circuit; hence, in prior art counters each step in the output voltage of the cathode follower becomes smaller as the voltage charge is increased. By means of this invention, however, means are provided for utilizing a very small portion of the beginning of the exponential characteristic of the charging condenser and, thus, the total derived voltage from the cathode follower output will be very nearly linear to the saturation point of the cathode follower.

The primary object of this invention is to provide a linear staircase counter in which a bootstrap characteristic is utilized in conjunction with a condenser charging circuit to produce a voltage charge which will be representative of a small portion of the beginning of the exponential characteristic of the condenser.

Another object of this invention is to provide a pulse synchronized, high speed, electronic switching circuit for charging a condenser by amounts directly proportional to the number of pulses applied to the circuit.

Another object of this invention is to provide an electronic switch capable of supplying a series of pulses having a high repetition rate to a charging condenser in a staircase counter circuit.

Still another object of this invention is to provide a staircase counter circuit having an electronic switch synchronized with a constant level of energy each time an impulse of varying level is applied to the staircase counter.

For a more complete understanding of the nature, advantage and further objects of this invention, reference should now be made to the following detailed description and to the accompanying drawing, in which The single figure is a schematic diagram of a preferred form of my invention.

In the drawing is shown a standard cathode-coupled one-shot multivibrator including the triodes 10 and 11. As in the usual multivibrator of this type, the cathodes of triodes 10 and 11 are interconnected and connected to ground through a cathode-biasing resistor 12, while each of the plates are connected to a B+ supply through resistors 13 and 14, respectively. Also, the plate of triode 10 is coupled to the grid of triode 11 by means of condenser 15, bias for the grid of triode 11 being provided by resistor 16. For firing the multivibrator, negative pulses may be applied at terminal 17 through condenser 18 to the plate of triode 10 or, in the alternative, positive pulses may be applied at the terminal 19 through the condenser 20 and across the grid-biasing resistor 21 to the grid of triode 10. In either event the output at the variable tap 22 of the one-shot multivibrator will always be a positive pulse of nearly constant duration, shape and amplitude, even though the input pulses may vary over a considerable range, and the time constants of the multivibrator can be arranged to handle input pulses having a very high repetition rate.

The multivibrator output at the variable tap 22 is applied through a condenser 23 and across biasing resistor 24 to a novel electronic switch which includes the triodes 25 and 26, and first and second charging condensers 27a and 27b, respectively. The triode 25 is supplied from a B+ supply through a diode 28 and is connected in a first series loop with the first charging condenser 27a and ground. A second series loop also exists from the first charging capacitor 27a through the grid-cathode biasing resistor 29, the triode 26, the second charging condenser 27b, and ground.

In the absence of a pulse at the output tap 22, the triode 26 is normally non-conducting; however, when the B+ supply is connected, the triode 25 conducts, charging condenser 27a at a rate consistent with the internal resistance of the triode 25. When the charge on condenser 27a reaches the cutoff bias of triode 25, that triode is then also cut off, and the system is ready for receiving a first pulse.

Upon the application of a positive pulse from the variable tap 22 of the one-shot multivibrator to the grid of triode 26, the triode 26 conducts, and the condenser 27a discharges through the resistor 29, the triode 26 and the condenser 27b. This results in a transfer of the charge originally on the condenser 27a to the condenser 27b. During the period of conduction of triode 26, the voltage appearing across resistor 29, due to the conduction of triode 26, maintains the triode 25 cut off. Upon the termination of the pulse at the tap 22, the triode 26 again becomes non-conductive, thereby reducing the voltage on resistor 29 to zero and again permitting conduction of triode 25 and, thus, the condenser 27a is again charged. A subsequent pulse will cause a repetition of the preceding cycle and will increase the charge on condenser 27b. Because the leakage paths associated with the condenser 27b offer a very high resistance path, and because condenser 27b is selected so as to have a good Q, a charge will be held on this condenser for considerable intervals of time. Depending upon the accuracy required, the condenser 27b may be capable of holding a charge for as long as several seconds.

The second charging condenser 27b is connected across the grid input circuit of a cathode follower triode 30. The plate of the cathode follower triode 30 is connected to the B+ supply and its cathode is connected to ground through a cathode load resistor 31. Thus, the charge accumulated on condenser 27b produces across the load resistor 31 a cathode follower voltage output which will be a direct function of the total charge on condenser 27b. If this charge is linear, the voltage across resistor 31 will also be linear; however, with the circuitry described to this point, the voltage across resistor 31 would be non-linear, since the condenser 27b is charged at an exponential rate, with the steps becoming smaller as the charge voltage on condenser 27b is increased.

In order to establish a voltage on condenser 27b which is very nearly linear, circuitry is employed which will utilize only the very small portion of the beginning of the exponential characteristic curve of the condenser. For this purpose a condenser 32 is connected between the terminal 33 of resistor 31 and the plate of triode 25. This results in a bootstrap operation, and the condenser 27a will be charged to a maximum amplitude which is a resultant of the voltage supplied by the diode 28 to the condenser 32, and that appearing across the resistor 31. Thus, the charge transferred from condenser 27a to condenser 27b represents only the initial portion of the exponential characteristic curve of the condenser 27a and is substantially linear. This means that the charge on condenser 27b is increased linearly with each pulse, and the voltage applied to the grid of triode 30 produces a substantially linear output across the resistor 31 until the triode 30 is saturated.

These results may be understood by analysis of the equation:

$$\Delta V_b = \frac{C_a}{C_a + C_b} V_a - V_b$$

where:

$V_a$=the voltage on condenser 27a,
$V_b$=the total accumulated voltage on condenser 27b,
$C_a$=capacitance of condenser 27a, and
$C_b$=capacitance of condenser 27b;

since the values of condensers 27a and 27b are fixed, this equation may be reduced to: $\Delta V_b = K(V_a - V_b)$; where K is a constant. If $V_a$ remains fixed, as would be the case when condenser 32 is omitted (or connected to ground), then it is clear that $\Delta V_b$ will decrease at an exponential rate as $V_b$ increases. However, with condenser 32 connected in circuit as shown, the voltage $V_a$ on condenser 27b also increases by an amount substantially equal to $\Delta V_b$ and, hence $V_a - V_b$ becomes a constant; thus $\Delta V_b$ is a constant for each successive charge, and the voltage output across resistor 31 is substantially linear to the saturation point of the triode 30.

In order to reset the charge on the condenser 27b to zero, there is provided a normally non-conducting triode 34, biased to cutoff by means of a grid-biasing resistor 35 connected to an adjustable negative source of potential by means of the fixed resistors 36 and 37, and a variable tap resistor 38. Upon the application of a positive pulse through a condenser 39 to the grid of triode 34, the triode 34 is rendered conductive and, depending upon the internal resistance of the triode 34, the condenser 27b may be discharged to ground through the triode 34 at a very rapid rate. A new series of pulses applied from the tap 22 through the condenser 23 to the grid of triode 26, will again charge condenser 27b to produce a new voltage level across resistor 31.

If it were undesirable for the reset wave-form to appear in the output, resistor 31 should be replaced by an integrating network with a time constant faster than that required to handle the input pulses, but slower than the reset time. The speed of the reset would be determined by the discharge time constant of condenser 27b through the plate resistance of triode 30. If this were a tube of the normal dual triode type, this might be in the order of milliseconds if condenser 27b were large. In extremely fast applications it might be desirable to use a grid-controlled thyratron for reset instead of triode 34.

Other applications of this device might be the generation of extremely linear sawtooth voltages whose slope was determined by the number and amplitude of pulses supplied per unit of time and which would be velocity-modulated in accordance with the frequency and shape of the driving pulse. The flyback time would be the reset speed.

Also, this system has the important advantage that it is substantially aperiodic and, thus, is capable of handling wide ranges of frequencies. For example, it is contemplated that the disclosed system may be capable of handling time pulses varying in duration and repetition from seconds to microseconds.

While vacuum tubes have been employed in the disclosed embodiment, it is clear that other electronic valves, such as transistors, may equally well be used. Many other modifications and adaptations will also become readily apparent to persons skilled in the art, and it is intended, therefore, that the invention be limited only by the following claims, as read in the light of the prior art.

What is claimed is:

1. A staircase counter comprising: a source of potential; a first condenser; a charging circuit for said first condenser, said charging circuit including a unidirectional conduction device in series with a normally conducting first electronic switch, said condenser, said unidirectional conduction device and said switch being connected across said source; a discharging circuit connected across said first condenser, said discharging circuit including a normally non-conducting second electronic switch connected in series with a second condenser; means rendering said second electronic switch conductive for predetermined periods, whereby said first condenser discharges through said second condenser, and means responsive to conduction of said second electronic switch for rendering said first electronic switch non-conductive during said predetermined period; a variable impedance electronic device and a load connected in series across said source, said device having a control electrode; means applying the voltage across said second condenser to said control electrode for producing a voltage on said load; and a third condenser connected between the junction of said unidirectional conduction device and said first electronic switch and the junction of said load and said variable impedance electronic device for adding said voltage on said load and the voltage of said source, and for recharging said first condenser with said added voltages.

2. A staircase counter comprising: a first condenser; means for charging said first condenser, said means including a source of voltage, a unidirectional conduction device, and a normally conducting first electronic valve connected in series with said first condenser, said electronic valve having a control electrode; a second condenser; means for discharging said first condenser through said second condenser, said means including a resistor and a normally non-conducting second electronic valve in series with said second condenser, said resistor, said second electronic valve, and said second condenser being connected across said first condenser, said resistor also being connected in circuit with said control electrode of said first electronic valve, whereby conduction through said resistor produces a voltage for biasing the control electrode of said first electronic control device beyond cutoff; a third electronic valve having an input circuit connected across said second condenser and having an output circuit including a fixed load; a condenser connected between said load and the junction of said unidirectional conduction device with said first electronic valve, whereby said first condenser is charged through said first electronic valve with a voltage equal to the summation of the voltage on said load and the voltage of said source; and means for repeatedly rendering said second electronic valve conductive for a predetermined duration, whereby said second condenser is repeatedly charged, and the voltage on said load is repeatedly increased at a rate proportional to the number of successive charges on said second condenser.

3. The invention as defined in claim 2 wherein said means for rendering said second valve conductive comprises the output of a one-shot multivibrator.

4. Apparatus of the character disclosed including: a cathode follower triode having a plate connected to a voltage source, a control grid, and a cathode connected to a point of reference potential through a load; a source of constant energy positive pulses; means for producing on said load a voltage having a magnitude directly proportional to the number of said pulses, said means comprising a unidirectional conduction device, a first electronic valve, and a condenser connected in series between said voltage source and said point of reference potential, said first electronic valve comprising a vacuum tube triode having a plate, a cathode and a control grid and being normally biased for conduction until said first condenser is charged to the cutoff voltage of said triode; a resistor, a second electronic valve and a second condenser connected in series from between the junction of the cathode of said first electronic valve and said first condenser to said point of reference potential, said resistor also being connected across said cathode and said grid of said first electronic valve, said second electronic valve comprising a vacuum tube triode having a plate, a cathode and a control grid, and normally being biased beyond cutoff, said second condenser being connected between said control grid of said cathode follower triode and said point of reference potential; means coupling said source of positive pulses to the control grid of said second electronic valve for rendering said valve conductive for predetermined repeated periods; and a condenser connected from the junction of said unidirectional conduction device and the plate of said first valve to the junction of said load and the cathode of said cathode follower triode, whereby said first condenser is charged with a voltage equal to the summation of the voltage of said source and the voltage across said load.

5. The invention as defined in claim 4, wherein said source of constant energy pulses comprises a one-shot multivibrator.

References Cited in the file of this patent
UNITED STATES PATENTS 2,567,845    Hoagland _____ Sept. 11, 1951